United States Patent [19]
Abe et al.

[11] Patent Number: 5,229,080
[45] Date of Patent: * Jul. 20, 1993

[54] RESISTANCE ADJUSTING TYPE HEATER AND CATALYTIC CONVERTER

[75] Inventors: Fumio Abe, Handa; Takashi Harada, Nagoya; Hiroshige Mizuno, Tajimi, all of Japan

[73] Assignee: NGK Insulators, Ltd., Japan

[*] Notice: The portion of the term of this patent subsequent to Nov. 5, 2008 has been disclaimed.

[21] Appl. No.: 853,007

[22] Filed: Mar. 17, 1992

Related U.S. Application Data

[63] Continuation of Ser. No. 581,990, Sep. 14, 1990, abandoned.

[30] Foreign Application Priority Data

Jun. 29, 1990 [JP] Japan .................................. 2-172931

[51] Int. Cl.$^5$ .......................... F01N 3/10; B01D 53/36; H05B 3/10
[52] U.S. Cl. .................................... 422/174; 422/177; 422/172; 422/180; 422/189; 55/523; 55/DIG. 30; 60/299; 60/300
[58] Field of Search ............... 422/174, 177, 179, 180, 422/199; 55/523, DIG. 30; 60/299, 300

[56] References Cited

U.S. PATENT DOCUMENTS

| | | | |
|---|---|---|---|
| 3,755,204 | 8/1973 | Sergeys | 502/241 |
| 3,768,982 | 10/1973 | Kitzner | 422/174 |
| 3,770,389 | 10/1973 | Kitzner | 422/180 X |
| 3,925,252 | 12/1975 | Yabuta et al. | 422/173 |
| 3,956,614 | 5/1976 | Hervert | 219/541 |
| 4,023,360 | 5/1977 | Wösner et al. | 60/277 |
| 4,322,387 | 3/1982 | Virk et al. . | |
| 4,345,430 | 8/1982 | Pallo et al. . | |
| 4,420,316 | 12/1983 | Frost et al. . | |
| 4,505,107 | 3/1985 | Yamaguchi et al. | 60/303 |
| 4,758,272 | 7/1988 | Pierotti et al. . | |
| 5,011,529 | 4/1991 | Hogue et al. . | |

FOREIGN PATENT DOCUMENTS

| | | |
|---|---|---|
| 0194507 | 2/1986 | European Pat. Off. . |
| 0355489 | 2/1990 | European Pat. Off. . |
| 1188373 | 3/1965 | Fed. Rep. of Germany . |
| 2333092 | 1/1975 | Fed. Rep. of Germany . |
| 61-161599 | 10/1986 | Japan . |
| 63-67609 | 5/1988 | Japan . |
| WO89/10471 | 11/1989 | PCT Int'l Appl. . |
| 1492929 | 11/1977 | United Kingdom . |
| 2049377 A | 12/1980 | United Kingdom . |

OTHER PUBLICATIONS

SwRI-9574 "Experimentation to Determine the Feasibility of Air Injection on an Electrically-Heated Catalyst for Reducing Cold-Start Benzene Emissions From Gasoline Vehicles" By Martin J. Heimrich, Jan. 1990.

*Primary Examiner*—Robert J. Warden
*Assistant Examiner*—Stephanie Blythe
*Attorney, Agent, or Firm*—Parkhurst, Wendel & Rossi

[57] ABSTRACT

A resistance adjusting type heater including a honeycomb structure with at least two electrodes provided thereon to supply a current to the honeycomb structure and with resistance adjusting elements provided between the electrodes. The resistance adjusting elements are formed such that a cross-section of a heating portion of the heater is substantially the same as that of a main monolithic catalyst. A catalytic converter includes the resistance adjusting heater which is disposed upstream of a main monolithic catalyst or between main monolithic catalysts. Also, the catalytic converter includes a resistance adjusting heater which is disposed downstream of a main monolithic catalyst. This resistance adjusting heater comprises a honeycomb structure with a catalyst carried thereon, with at least two electrodes provided thereon to supply a current to the honeycomb structure and with a resistance adjusting elements provided between the electrodes. The resistance adjusting elements are formed such that the cross-section of a heating portion of the heater is substantially the same as that of the main monolithic catalyst.

7 Claims, 3 Drawing Sheets

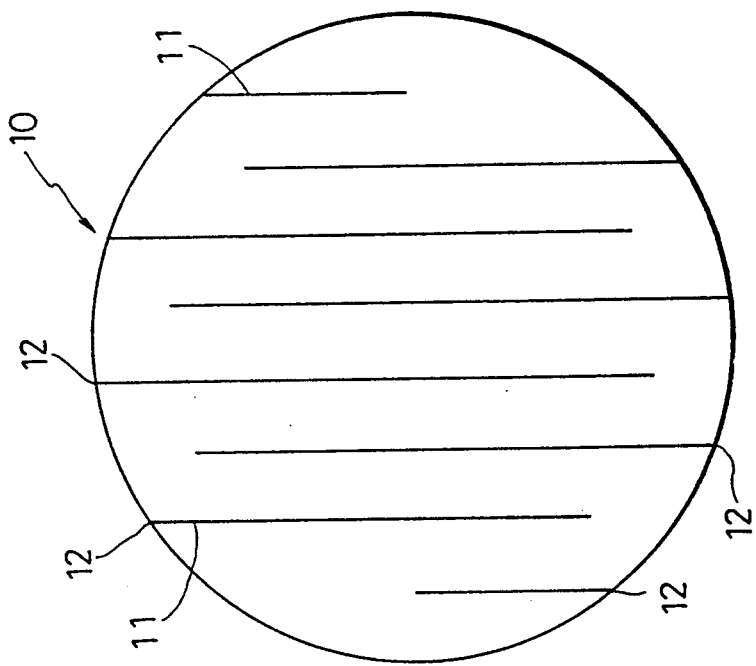
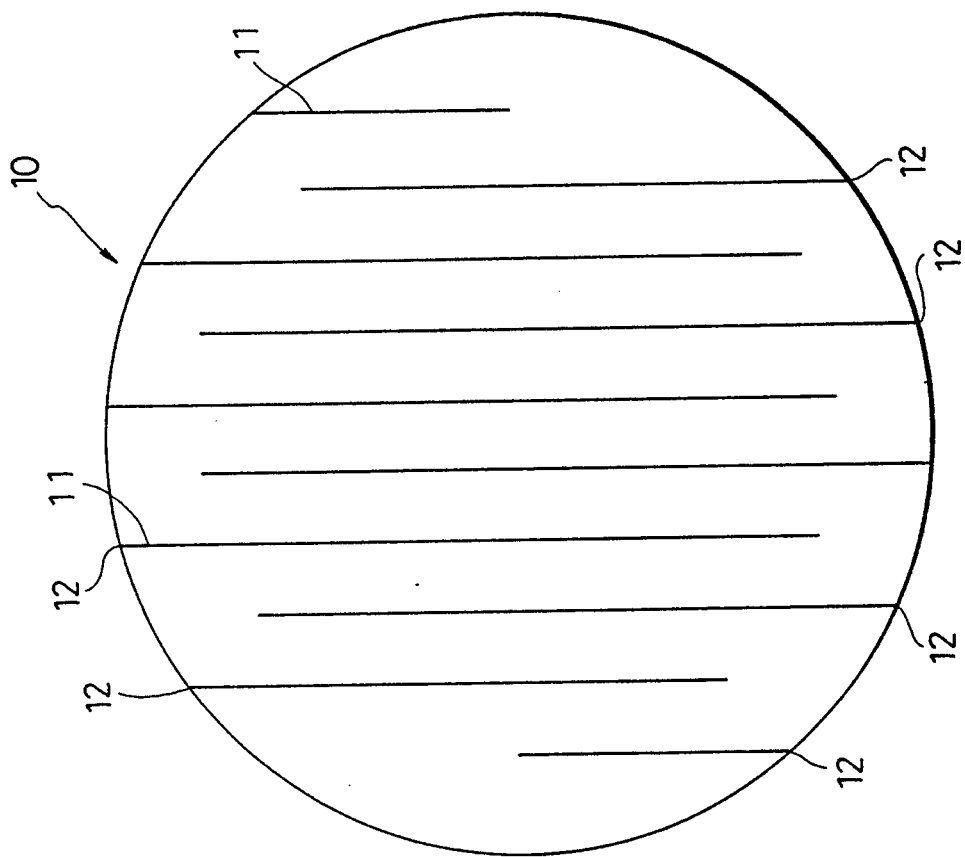

RESISTANCE ADJUSTING TYPE HEATER AND CATALYTIC CONVERTER

This is a continuation of application Ser. No. 07/581,990 filed Sep. 14, 1990, now abandoned.

BACKGROUND OF THE INVENTION

1. Field of the Invention

The present invention relates to a resistance adjusting type heater and a catalytic converter which are suitable for use in automotive exhaust emissions control.

2. Description of the Related Art

Conventionally, porous ceramic honeycomb structures have been employed as catalysts or substrates for catalyst which remove, for example, nitrogen oxides ($NO_x$), carbon monoxide (CO) and hydrocarbon (HC) present in the exhaust gas of internal combustion engines, such as automobiles. Recently, however, metal honeycomb structures have been drawing attention as such catalysts or substrates therefor.

Apart from the above catalysts or catalyst substrates, as restrictions on exhaust emissions have been intensified, there has been a demand for development of heaters or catalytic converters capable of converting the emissions of an engine when it is started.

Such honeycomb structures have been proposed in, for example, Japanese Utility Model Laid-Open No. 67609/1988. This disclosed technique is a catalytic converter comprising a metal monolithic catalyst which is disposed upstream of and adjacent to a main ceramic monolithic catalyst. The metal monolithic catalyst comprises an electrically conductible metal substrate with alumina coated thereon.

However, in the catalytic converter disclosed in Japanese Utility Model Laid-Open No. 67609/1988, the metal monolithic catalyst, a preheater, disposed upstream and adjacent to the main monolithic catalyst comprises a foil-type metal honeycomb structure which is constructed such that it is conducted and thereby heated from the inner periphery thereof to the outer periphery thereof. The resistance of the metal monolithic catalyst is not adjusted (i.e., only the material, dimensions and rib thickness of the metal honeycomb structure are defined and no adjustment is made on the resistance of the metal honeycomb structure). Furthermore, since the diameter of the metal monolithic catalyst is substantially the same as that of the main monolithic catalyst, the catalytic converter exhibits insufficient temperature rising characteristics.

SUMMARY OF THE INVENTION

Accordingly, an object of the present invention is to provide a resistance adjusting type heater and catalytic converter which eliminate the aforementioned problems of the prior techniques.

To this end, the present invention provides a resistance adjusting type heater which comprises a honeycomb structure with at least two electrodes provided thereon to supply a current to the honeycomb structure and with a resistance adjusting means provided between the electrodes. The resistance adjusting means is formed such that the cross-section of a heating portion of the heater is substantially the same as that of a main monolithic catalyst.

The present invention further provides a catalystic converter which includes a resistance adjusting heater which is disposed upstream of a main monolithic catalyst or between main monolithic catalysts. The resistance adjusting heater comprises a honeycomb structure with at least two electrodes provided thereon to supply a current to the honeycomb structure and with a resistance adjusting means provided between the electrodes. The resistance adjusting means is formed such that the cross-section of a heating portion of the heater is substantially the same as that of the main monolithic catalyst. The present invention also provides a catalystic converter which includes a resistance adjusting heater which is disposed downstream of a main monolithic catalyst. The resistance adjusting heater comprises a honeycomb structure with a catalyst carried thereon, with at least two electrodes provided thereon to supply a current to the honeycomb structure and with a resistance adjusting means provided between the electrodes. The resistance adjusting means is formed such that the cross-section of a heating portion of the heater is substantially the same as that of the main monolithic catalyst.

Preferably, the heater has a diameter larger than that of the main monolithic catalyst.

BRIEF DESCRIPTION OF THE DRAWINGS

FIGS. 1 and 2 are respectively plan views of two types of honeycomb heaters having different outer diameters;

DETAILED DESCRIPTION OF THE INVENTION

Figure 2A:
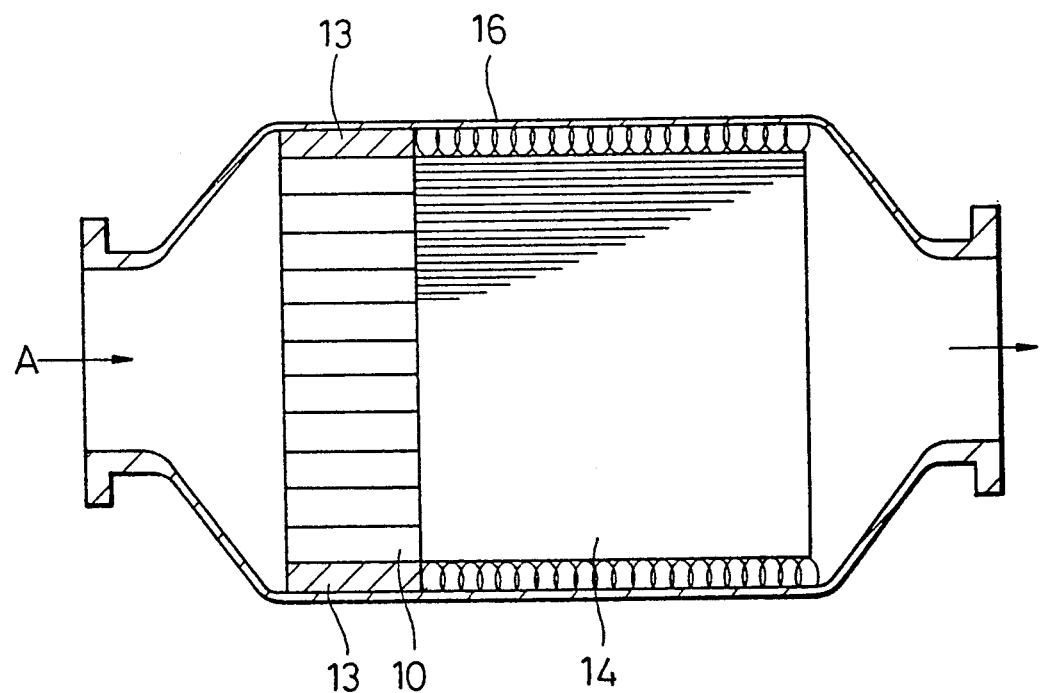
FIGS. 2(a) and 2(b) are respectively cross-sectional views of catalytic converters employing the different types of honeycomb heaters having different outer diameters in each of which a honeycomb heater is disposed upstream of a main monolithic catalyst.

The resistance adjusting type heater according to the present invention comprises a honeycomb structure with at least two electrodes provided thereon to supply a current to the honeycomb structure and with a resistance adjusting means provided between the electrodes. The resistance adjusting means is provided such that the cross-section of a heating portion of the heater is substantially the same as that of the main monolithic catalyst provided together with the heater.

When the resistance is adjusted in the manner described above, it is possible to control the heating characteristics of the heater.

Preferably, the portion of the heater other than the heating portion is sealed by a heat insulating material or the like to prevent an exhaust gas from flowing along that portion and thereby making the exhaust gas flow only along the heating portion of the heater. In this way, the exhaust gas can be heated quickly. In that case, the electrodes do not make contact with the exhaust gas, and corrosion of the electrodes due to the exhaust gas can be eliminated.

Whereas any material, ceramic or metal, capable of generating heat when energized, can be used as the material of the honeycomb structure which is a basic body of the present invention, the use of metal enhances the mechanical strength and is thus preferred. Examples of such metals include stainless steel and materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. The honeycomb structure employed in the present invention may be porous or non-porous. In the case where a catalyst is carried on the honeycomb structure, however, a porous honeycomb structure is preferred because a catalyst layer can be closely adhered to such a honeycomb structure, and hardly peels off the honeycomb structure even when a difference in the thermal expansion between the honeycomb structure and the catalyst exists.

The metal honeycomb structure will be prepared in the manner described below.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

Next, the formed honeycomb body is fired in a non-oxidizing atmosphere at a temperature ranging between 1000° and 1450° C. During sintering in the non-oxidizing atmosphere containing hydrogen, the organic binder is decomposed and thereby removed with the aid of Fe or the like, which acts as a catalyst. A good sintered body (a honeycomb structure) can therefore be obtained.

Firing at a temperature lower than 1000° C. achieves no sintering. Sintering conducted at a temperature higher than 1450° C. causes deformation of the resulting sintered body and is thus undesirable.

Preferably, a heat-resistant metal oxide is then coated on the surface of the cell walls and the surface of the pores of the obtained honeycomb structure.

Next, a resistance adjusting mechanism of a desired form is preferably provided on the obtained honeycomb structure between the electrodes thereof, which will be described later.

The resistance adjusting mechanism provided on the honeycomb structure may take on any of the following forms:

(1) a slit or slits of any length, formed in any direction at any position;
(2) variations in the length of the cell walls in the axial direction of the passages
(3) variations in the thickness (wall thickness) of the cell walls of the honeycomb structure or variations in the cell density of the honeycomb structure, or
(4) a slit or slits formed in the cell wall (rib) of the honeycomb structure.

Among the above-mentioned forms, formation of a slit or slits according to No. (1) is more preferable because it can easily control a heated portion.

Electrodes are provided generally on the outer peripheral portion of or inside of the thus-obtained metal honeycomb structure by welding or brazing to manufacture a honeycomb heater.

The term; and "electrodes" is used in this application to refer to any terminal through which a voltage is applied to the heater. The electrodes include the direct bonding of the outer peripheral portion of the heater to a can body and terminals for grounding.

In the case of the metal honeycomb structure which is used as a heater, the resistance thereof will be preferably held between 0.001 $\Omega$ and 0.5 $\Omega$.

Preferably, a catalyst is placed on the surface of the thus-obtained metal honeycomb structure so as to allow heat to be generated due to reaction (oxidation) of the exhaust gas.

The catalyst supported on the surface of the metal honeycomb structure is made of a carrier having a high surface area and a catalyst activating material supported on the carrier. Typical examples of carriers having a high surface area include $\gamma$-$Al_2O_3$, $TiO_2$, $SiO_2$-$Al_2O_3$ and perovskite. Examples of the catalytic activating material include noble metals, such as Pt, Pd and Rh, and base metals, such as Cu, Ni, Cr and Co. The preferred catalyst comprises one in which from 10 to 100 g/ft$^3$ Pt or Pd is loaded on the carrier made of $\gamma$-$Al_2O_3$.

Whereas the honeycomb structure employed in the present invention may have any honeycomb configuration, it is desirable that the cell density ranges from 6 to 1500 cells/in$^2$ (0.9 to 233 cells/cm$^2$) with a wall thickness ranging from 50 to 2000 $\mu$m.

As stated above, the honeycomb structure employed in the present invention may be porous or non-porous. To achieve sufficient mechanical strength and resistance to oxidation and corrosion, however, the porosity of the metal honeycomb structure will preferably be held between 0 and 50% by volume with most preferable porosity being less than 25% by volume. In a metal honeycomb structure designed for use as a catalyst substrate, the porosity will be held to 5% or above to ensure strong adhesion between the honeycomb structure and a catalyst layer.

The term "honeycomb structure" refers to an integral body having a large number of passages partitioned by the walls. The passages may have any cross-sectional form (cell shape), e.g., a circular, polygonal or corrugated form.

The present invention will further be illustrated in the following examples which are intended to be illustrative, but not limiting, of this invention.

FIGS. 1(a) and 1(b) are respectively plan views of different types of honeycomb heaters respectively having an outer diameter of 90 mm$\phi$ and 120 mm$\phi$. In each honeycomb heater, a plurality of slits 11, which act as the resistance adjusting mechanisms, are provided in a honeycomb structure 10 having a large number of passages. An outer peripheral portion 12 of each slit 11 is charged with and thereby electrically insulated by an inorganic adhesive. Two electrodes are provided on the outer wall of the honeycomb structure 10 to make it a honeycomb heater.

Figure 2B:
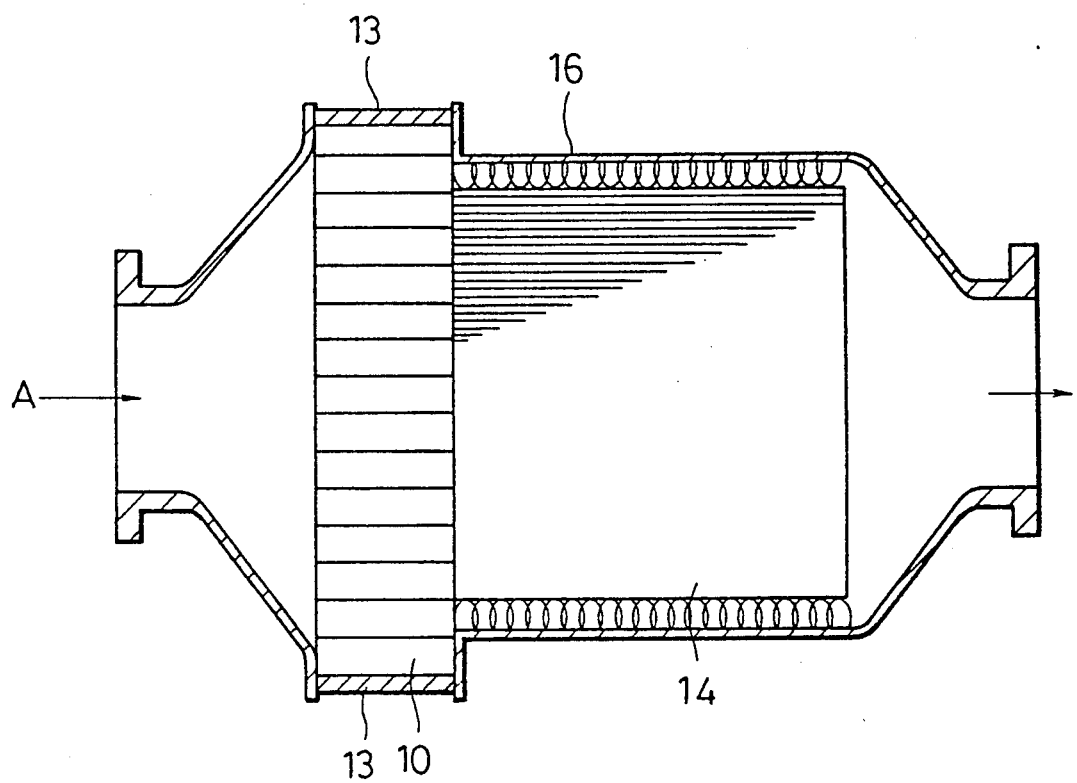

FIGS. 2(a) and 2(b) respectively show catalytic converters employing two different types of honeycomb heaters 10 respectively having an outer diameter of 90 mm$\phi$ and 120 mm$\phi$. In each catalytic converter, the honeycomb heater 10 is disposed upstream of a main monolithic catalyst 14. A reference numeral 16 denotes an outer frame.

EXAMPLE

Fe powder, Fe-Cr powder and Fe-Al powder were mixed to prepare a mixture having a composition of Fe-20Cr-5Al (% by weight). The obtained mixture was then formed by extrusion into honeycomb bodies. The formed honeycomb bodies were sintered in $H_2$ a atmosphere to obtain honeycomb structures respectively having an outer diameter of 90 mm$\phi$ and 120 mm$\phi$. Both honeycomb structures had a thickness of 15 mm, a cell wall (rib) thickness of 4 mil (0.10 mm) and a passage density of 400 cpi$^2$. Thereafter, slits 11 were formed in the obtained honeycomb structures 10 having a large number of passages, as shown in FIGS. 1(a) and 1(b). The outer peripheral portion 12 of each slit 11 was filled with an inorganic adhesive of $ZrO_2$. The slits 11 were formed in such a manner that they were separated from each other by a distance corresponding to eight cell walls, i.e., seven cells.

A layer of γ-alumina in which $CeO_2$ was present in a proportion of 8 wt % was coated on each of the honeycomb structures 10. Thereafter, 20 g/ft$^3$ of Pd and Pt were respectively loaded on the coated layer. The whole structure was then sintered at 600° C. to obtain a catalyst. Subsequently, two electrodes 13 were provided on the outer wall of each of the obtained honeycomb structures 10, as shown in FIGS. 2(a) and 2(b). Each of the obtained honeycomb heaters was disposed in front of a three-way main monolithic catalyst 14, as shown in FIGS. 2(a) and 2(b). The three-way catalyst 14 had a rib thickness of 6 mil, a passage density of 400 cells/in$^2$, an outer diameter of 90 mmφ and a length of 100 mm.

Figure 3:
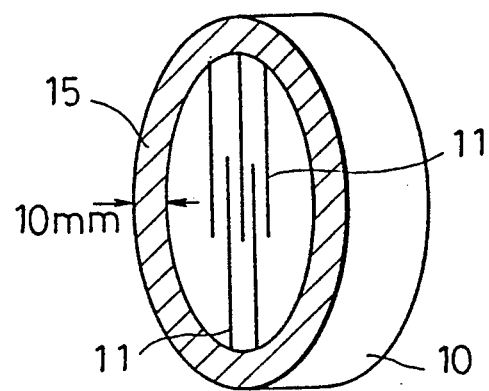
FIG. 3 is a perspective view of a catalystic converter whose outer peripheral portion is sealed by a heat insulating material.

An outer peripheral portion 15 of the heater having an outer diameter of 120 mmφ was sealed by a heat insulating material over a width of 10 mm so that no exhaust gas flowed therethrough, as shown in FIG. 3.

The diameter of the heating portion of the heater having an outer diameter of 90 mmφ was about 70 mmφ, and the diameter of the heater portion of the heater having an outer diameter of 120 mmφ was about 90 mmφ.

The performance of each of these catalytic converter systems at the beginning of the operation of an engine was tested by introducing into the system an exhaust gas (A/F=14.6) whose temperature was raised at a fixed speed from 100° C. to 420° C. for two minutes and was then maintained at 420° C. for one minute and by measuring the conversion for CO, HC and NOx. At that time, the heater was first energized for five seconds by a battery of 24 V and then turned on and off so as to maintain the temperature thereof at 450° C. While the heater was on, it was energized by a battery of 12 V.

The following table shows the results of these measurements.

| Heater | Average conversion (%) | | |
|---|---|---|---|
| | CO | HC | NOx |
| 90 mmφ | 68 | 53 | 66 |
| 120 mmφ | 72 | 58 | 70 |

As is clear from the above Table, since the heater having an outer diameter of 120 mmφ has substantially the same heating area as that of the main monolithic catalyst disposed at the rear of (downstream of) the heater, the entirety of the main monolithic catalyst can be heated relatively uniformly. Furthermore, since a wider area of the catalyst carried on the heater can be heated, conversion can be performed efficiently, resulting in an increase in the conversion.

As will be understood from the foregoing description, in the heater and catalytic converter according to the present invention, since the resistance adjusting means is formed on the heater such that the heating portion thereof is substantially the same as the cross-section of the main monolithic catalyst provided together with the heater, the overall main monolithic catalyst can be heated by the heater relatively uniformly. Furthermore, since a wider area of the catalyst carried on the heater can be heated, conversion can be performed efficiently.

What is claimed is:

1. A catalytic converter for a fluid to be flowed therethrough, comprising:
   (i) at least one main monolithic catalyst capable of being disposed in a fluid stream; and
   (ii) a heating element capable of being disposed in said fluid stream and being adjacent to said at least one main monolithic catalyst, said heating element comprising:
      an electrically conductive monolithic honeycomb structure having a radical periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
      at least two electrodes in electrical contact with said honeycomb structure;
      wherein a cross-section of said heated portion taken generally perpendicular to said axial direction has an area which is substantially the same as an area of a corresponding cross-section of said at least one main monolithic catalyst.

2. The catalytic converter of claim 1, wherein said heating element is disposed in a location selected from the group consisting of upstream of said at least one main monolithic catalyst, downstream of said at least one main monolithic catalyst and between a plurality of main monolithic catalysts.

3. The catalytic converter of claim 1, wherein said heating element further comprises a catalyst material formed on said partition walls.

4. The catalytic converter of claim 1, wherein said slit pierces the radial periphery of said honeycomb structure.

5. The catalytic converter of claim 1, wherein a cross-section of said heating element taken generally perpendicular to said axial direction has an area which is larger than an area of a corresponding cross-section of said main monolithic catalyst.

6. The catalytic converter of claim 1, wherein said electrodes are in electrical contact with the radial periphery of said honeycomb structure.

7. The catalytic converter of claim 6, wherein said electrodes are located in opposition to each other across a volume of said honeycomb structure, in a direction which is generally transverse to said axial direction.

* * * * *